US011188580B2

(12) United States Patent
Osmon et al.

(10) Patent No.: US 11,188,580 B2
(45) Date of Patent: Nov. 30, 2021

(54) MAPPING NATURAL LANGUAGE UTTERANCES TO NODES IN A KNOWLEDGE GRAPH

(71) Applicant: INTUIT INC., Mountain View, CA (US)

(72) Inventors: Cynthia J. Osmon, Sunnyvale, CA (US); Roger C. Meike, Redwood City, CA (US); Sricharan Kallur Palli Kumar, Mountain View, CA (US); Gregory Kenneth Coulombe, Sherwood Park (CA); Pavlo Malynin, Menlo Park, CA (US)

(73) Assignee: INTUIT, INC., Mountain View, CA (US)

( * ) Notice: Subject to any disclaimer, the term of this patent is extended or adjusted under 35 U.S.C. 154(b) by 123 days.

(21) Appl. No.: 16/588,873

(22) Filed: Sep. 30, 2019

(65) Prior Publication Data

US 2021/0097096 A1    Apr. 1, 2021

(51) Int. Cl.
*G06F 40/30* (2020.01)
*G06F 16/332* (2019.01)
(Continued)

(52) U.S. Cl.
CPC .......... *G06F 16/3329* (2019.01); *G06F 40/30* (2020.01); *G06N 5/02* (2013.01); *G10L 15/063* (2013.01)

(58) Field of Classification Search
CPC .................... G06F 16/3329; G06F 16/3344
See application file for complete search history.

(56) References Cited

U.S. PATENT DOCUMENTS

| 10,607,298 B1 | 3/2020 | Hanekamp, Jr. et al. |
| 2007/0106499 A1* | 5/2007 | Dahlgren .............. G06F 16/243 704/10 |

(Continued)

OTHER PUBLICATIONS

Zheng, Weiguo, et al. "Natural language question/answering: Let users talk with the knowledge graph." Proceedings of the 2017 ACM on Conference on Information and Knowledge Management. 2017. (Year: 2017).*

(Continued)

*Primary Examiner* — Jialong He
(74) *Attorney, Agent, or Firm* — Patterson + Sheridan, LLP (57) ABSTRACT

Certain aspects of the present disclosure provide techniques for mapping natural language to stored information. The method generally includes receiving a long-tail query comprising a natural language utterance from a user of an application associated with a set of topics and providing the natural language utterance to a natural language model configured to identify nodes of a knowledge graph. The method further includes, based on output of the natural language model, identifying a node of a knowledge graph associated with the natural language utterance, wherein the output of the natural language model includes a node identifier for the node of the knowledge graph and providing the node identifier to the knowledge engine. The method further includes receiving a response associated with the node of the knowledge graph from the knowledge engine and transmitting the response to the user in response to the long-tail query.

19 Claims, 6 Drawing Sheets

(51) Int. Cl.
*G06N 5/02* (2006.01)
*G10L 15/06* (2013.01)

(56) References Cited

U.S. PATENT DOCUMENTS

| | | | |
|---|---|---|---|
| 2011/0047169 A1* | 2/2011 | Leighton | G06F 19/00 707/756 |
| 2013/0262361 A1* | 10/2013 | Arroyo | G06F 16/245 706/46 |
| 2013/0262501 A1* | 10/2013 | Kuchmann-Beauger | G06F 16/9024 707/769 |
| 2014/0236579 A1* | 8/2014 | Kurz | G06F 16/3344 704/9 |
| 2014/0280307 A1* | 9/2014 | Gupta | G06N 5/025 707/769 |
| 2015/0332670 A1* | 11/2015 | Akbacak | G06F 40/40 704/9 |
| 2016/0012044 A1* | 1/2016 | Franceschini | G06F 16/951 707/722 |
| 2016/0179934 A1* | 6/2016 | Stubley | G06N 5/00 707/722 |
| 2016/0225370 A1* | 8/2016 | Kannan | G10L 15/063 |
| 2018/0060301 A1* | 3/2018 | Li | G06N 3/08 |
| 2018/0196796 A1 | 7/2018 | Wu | |
| 2019/0034780 A1* | 1/2019 | Marin | G06N 3/006 |
| 2019/0182382 A1 | 6/2019 | Mazza et al. | |
| 2019/0303498 A1* | 10/2019 | Saha | G06N 5/003 |

OTHER PUBLICATIONS

PCT/US2020/036589, International Search Report and Written Opinion dated Aug. 24, 2020, 15 pages.

Zhipeng Huang et al., "KB-Enabled Query Recommendation for Long-Tail Queries," CIKM 2016, Oct. 24-28, 2016, DOI: http://dx.doi.org/10.1145/2983323.2983650, pp. 2107-2112.

* cited by examiner

MAPPING NATURAL LANGUAGE UTTERANCES TO NODES IN A KNOWLEDGE GRAPH

Aspects of the present disclosure relate to mapping natural language information to non-natural language data.

An important aspect of maintaining software applications for computing devices (or other types of services) is to provide customer support (such as technical help) to users. Commonly, material such as help guides, frequency asked questions (FAQ) documents or other compilations of technical information may be provided to assist users. In general, such material may be able to provide extensive information to some users, but only users knowledgeable enough about a particular software application may be able to effectively use such material. Currently, no systems allow users to effectively search for technical information of a software application in their own words. Thus, systems and methods are needed to map natural language of users to technical information of a software application.

BRIEF SUMMARY

Certain embodiments provide a method for mapping natural language to stored information. The method generally includes receiving a long-tail query comprising a natural language utterance from a user of an application associated with a set of topics and providing the natural language utterance to a natural language model configured to identify nodes of a knowledge graph, wherein the knowledge graph is associated with a knowledge engine configured to respond to queries associated with the set of topics. The method further includes, based on output of the natural language model, identifying a node of the knowledge graph associated with the natural language utterance, wherein the output of the natural language model includes a node identifier for the node of the knowledge graph and providing the node identifier to the knowledge engine. The method further includes receiving a response associated with the node of the knowledge graph from the knowledge engine and transmitting the response to the user in response to the long-tail query.

Other embodiments provide a method for training a natural language model, comprising. The method generally includes identifying a topic of a domain of topics associated with an application and obtaining, from a knowledge engine configured to respond to queries associated with the domain of topics, one or more strings associated with the topic, wherein the knowledge engine is configured to output information from a node of a knowledge graph based on a node identifier associated with the node of the knowledge graph. The method further includes generating a set of training data including the one or more strings associated with the topic, wherein the one or more strings are associated with the node identifier and training a natural language model using the training data, wherein the natural language model is configured to identify nodes of the knowledge graph based on natural language utterances. The method further includes using the natural language model to identify a first node of the knowledge graph based on input received from a user.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for mapping natural language utterances to knowledge graph data.

Generally, a provider of a software makes various sources of information about the software available to users, such as for customer support purposes. One such source of information may be a knowledge graph, a representational data structure used to store many types of data. For example, by tracking a user's progress through a particular software execution, a knowledge graph may be accessed to provide a quick-access answers at the user's point of progress. A knowledge graph typically includes a number of nodes, each corresponding to a particular data item or set of related data. Continuing the example above, a node may include data relating to a particular point of the software, including, but not limited to, a node identifier, a title of the query, and a response to the query.

In some cases, a knowledge graph is made available to users through a graph interface, which may be integrated into the user interface of an application. Such knowledge graphs may provide utility to users during execution of the application. However, the structure of the knowledge graph allows users to access the information of the knowledge graph only when prompted by the application itself, when the user is interacting with a particular node. To access data of the knowledge graph other than the information related to the particular node, the user typically must navigate the graph interface manually. For example, if the graph interface presents information as an article for a particular topic, the user may have to navigate additional related articles to locate information of a related, but distinct topic. Users unfamiliar with the application, or with the graph interface, may be unable to locate information outside of the particular node prompted by the software.

As a result, software providers typically provide other real time customer assistance services to users to provide answers to questions that may be regarding a node other than the one a user is currently interacting with. Real time customer assistance can provided using tools including "chatbots" or other similar real time customer assistance systems, that use artificial intelligence (AI) and/or machine learning (ML) to determine responses to, and interaction with, a customer. Such a chatbot can provide an automated answering service that determines the best answers to questions and provide those answers to customer support agents within existing communication applications. Chatbots typically are able to respond to "conversational" queries, meaning queries posed by users in non-technical language.

That is, a software provider may make both a knowledge graph and a chatbot available to users through different channels. Thus, users accustomed to accessing customer assistance via the chatbot may be unfamiliar with usage of the knowledge graph, and vice versa. Further, chatbots may be poorly suited for responding to certain types of queries. For example, chatbots typically struggle to generate responses for long-tail queries. "Long-tail" queries are queries within the long "tail" of a query distribution chart. A query distribution chart includes a body of a (typically small) number of frequently asked "short-tail" queries and a tail of a (typically larger) number of less frequently asked queries. Thus, a long-tail query indicates an infrequently posed query, which may require a more specific response than a "short-tail" query.

Knowledge graphs may include information which can be used to answer such long-tail queries, due to the more comprehensive structure of knowledge graphs, but, as discussed, users may struggle to locate such information in some cases. As a result, in current systems, neither knowledge graphs nor chatbots may be able to effectively allow users to respond to all, or even most, long-tail queries, which frequently results in users requesting help from live support agents. Though live support agents may be able to answer such long-tail queries, users may have to wait long periods to be connected to a live support agent in some cases, which may worsen user experience with the software. Additionally, the cost to the software provider of providing live support agents is significantly more than automated support systems.

However, by combining the features of chatbots to allow users to ask questions relating to any part of the software in the user's own natural language, with the more in-depth information provided by knowledge graphs, a system for automated response to long-tail queries is possible. Although current systems do not allow for compatibility between chatbot systems (or other systems utilizing user-worded queries) and knowledge graphs, such compatibility can be obtained by use of the systems and methods described herein. In particular, a natural language model and a response orchestrator may be provided. A natural language model is a machine learning model trained to identify natural language utterances. A response orchestrator is a software routine used to communicate between a chatbot application (or other user-facing application) and a knowledge graph. First, the response orchestrator receives, from the chatbot, a user query. The response orchestrator then provides the user query to the natural language model, the natural language model having been previously trained using the nodes of the knowledge graph. The output of the natural language model is an identification of a particular node of the knowledge graph. The response orchestrator may then access the identified node to obtain a response to the user query, passing this response along to the chatbot.

Use of such a method may provide users with more timely and more informational responses than is possible with the use of only a chatbot application or a knowledge graph system alone. This may lead to greater user satisfaction with the software as a whole. Additionally, users that receive responses to their queries using such a system do not have to resort to the use of live customer service agents, freeing those customer service agents for other users, and potentially reducing the load on the customer assistance system in general.

Figure 1:
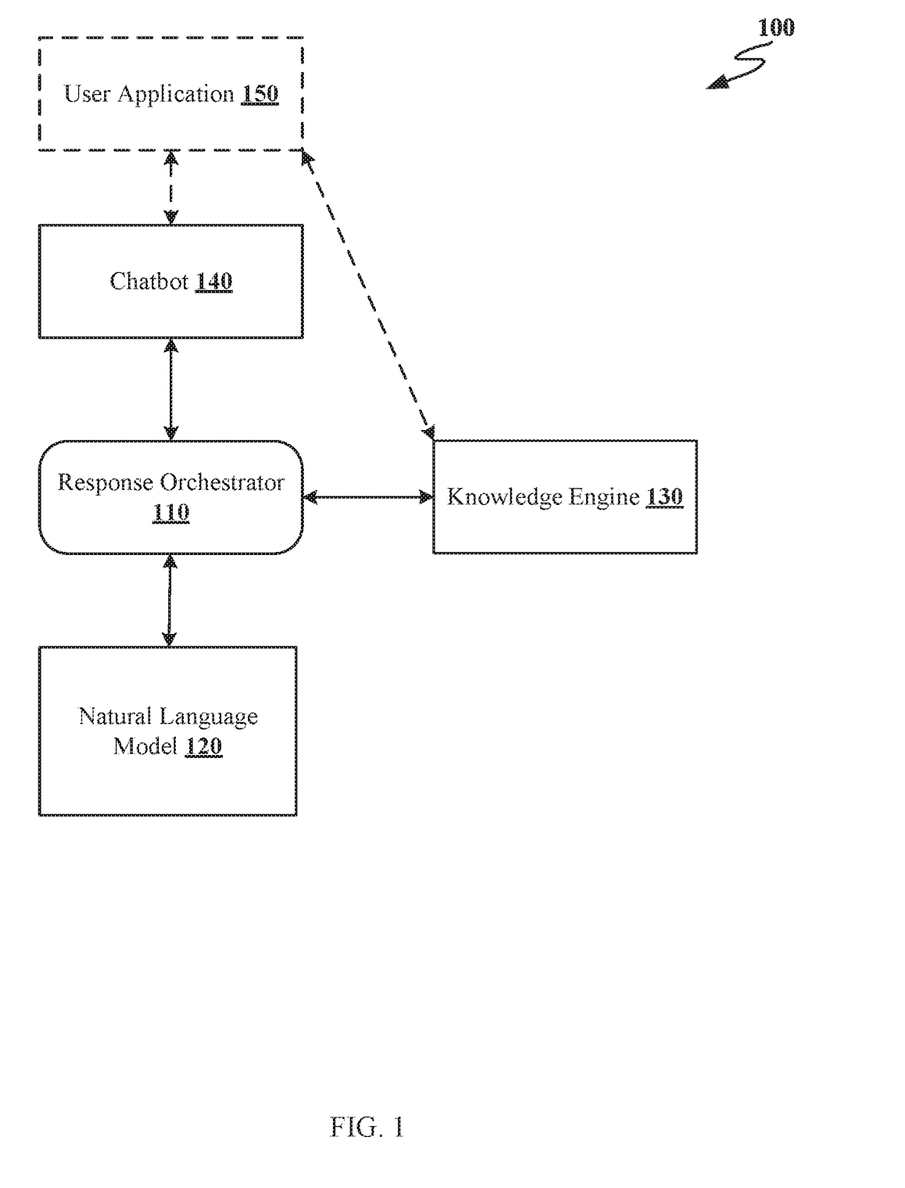
FIG. 1 is a block diagram of components of an example computing system.

FIG. 1 is a block diagram of components of an example computing system 100. The components of computing system 100 represent software routines or subroutines executing on one or more computing devices of computing system 100 (not shown). The computing devices of computing system 100 including at least a processor and a memory (not shown). The computing devices may include servers and user devices executes in a client-server relationship.

Computing system 100 includes response orchestrator 110, natural language model 120, knowledge engine 130, chatbot 140 and, in some cases, user application 150. User application 150 is a client-side application provided to a customer, or user, via various methods, such as a desktop application executing on a desktop or laptop computer, a mobile application executing on a mobile phone or other mobile device, or via a web browser application executing on a computing device.

Chatbot 140 is a real-time customer assistance system associated with user application 150, that is used to provide a means for users of user application 150 to receive automated responses to queries. For example, if a user of user application 150 has a question about a particular aspect of user application 150, the user may provide the question to chatbot 140, which can then process the question and provide a response to the user. Chatbot 140 may execute as part of web-accessible application 150, as a separate application on a user device associated with the user, or integrated into a third-party application or service utilized by the user. Depending on the device chatbot 140 executes, queries may be provided to chatbot 140 via various methods, such as typing questions via an attached keyboard, entering questions via an on-screen touch keyboard, by speaking questions into a microphone, or other input methods.

In general, chatbot 140 responds to user queries by use of a response database (not shown). When a user query is received, chatbot 140 parses the user query to identify any available alternatives to words used in the user query. Then, chatbot 140 accesses the response database to determine if a response to the user query exists in the response database and can be used to respond to the user query automatically. In most cases, a user query corresponding to a response in the response database is a short-tail query. If no response to the user query can be located, chatbot 140 may determine that the user query is a long-tail query, of the sort that may be more suited to response using knowledge engine 130. Chatbot 140 may forward received long-tail queries to response orchestrator 110 for assistance in response.

Response orchestrator 110 is a software routine executing on a computing device provided by the application provider, such as an application server. In general, response orchestrator 110 interfaces with chatbot 140 to process long-tail queries for a user of user application 150. Response orchestrator 110 can also interface with knowledge engine 130 in order to provide responses generated by knowledge engine 130 to chatbot 140, so that chatbot 140 can in-turn provide the response to a user.

Knowledge engine 130 is a knowledge graph interface used access nodes of a knowledge graph, the knowledge graph being associated with user application 150. In general, knowledge engine 130 may output various information about a particular topic related to user application 150 after receiving an identification of a particular node of the knowledge graph as input. For example, if user application 150 is a tax preparation application, the knowledge graph may include information about particular aspects of applicable tax law for the user, as well as methods of processing the user's tax information, in addition to basic functionality information of the tax preparation application. Knowledge engine 130 may be, in some examples, integrated with user application 150, such that as a user of user application 150 proceeds through user application 150, various responses of knowledge engine 130 may be provided to the user as customer assistance. In such a case, user application 150 tracks the user's progress through user application 150, and requests information from knowledge engine 130 based on an identification of a particular node of the knowledge graph associated with the user's current point in user application 150.

In general, the knowledge graph includes a plurality of nodes used to store information related to particular aspects of user application 150. Continuing the example above, if user application 150 is a tax preparation application, one node of the knowledge graph may correspond to a particular aspect of tax preparation, such as information related to calculating a user's average annual tax.

In general, response orchestrator 110 can be used to obtain a response to a user query received at chatbot 140, using knowledge engine 130. First, response orchestrator 110 identifies a node of the knowledge graph corresponding to the user query. To do so, response orchestrator 110 provides the user query to natural language model 120.

Natural language model 120 is a software module used to identify nodes of the knowledge graph corresponding to one or more natural language utterances, such as, in this example, a user query. As described in further detail with respect to FIG. 2 below, natural language model 120 may be previously trained using data obtained from the knowledge graph. As a result, when provided with natural language utterances, natural language model 120 is capable of identifying one or more nodes of the knowledge graph corresponding to the natural language utterances. Natural language model 120 outputs one or more node identifiers corresponding to the identified nodes of the knowledge graph.

Upon receipt of the node identifiers from natural language model 120, response orchestrator 110 obtains data from the corresponding nodes of the knowledge graph, and uses the obtained data to generate a response to the initial user query. This response is then transmitted to chatbot 140 for display to the user.

Figure 2:
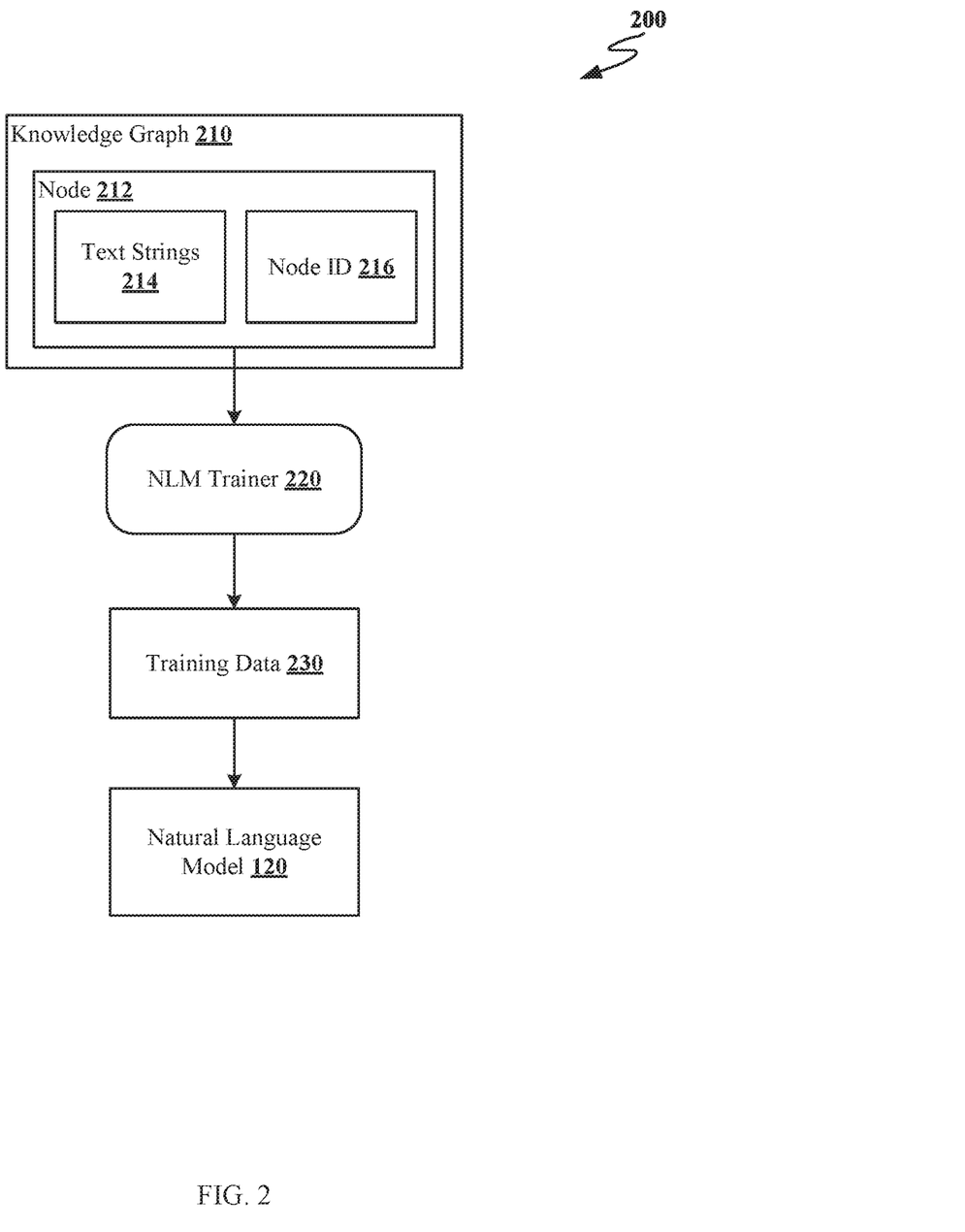
FIG. 2 is an information flow diagram of an operation for training a natural language model.

FIG. 2 is an information flow diagram of an operation 200 for training a natural language model 120. Operation 200 may be performed by NLM trainer 220, a software routine executing on a computing device, such as an application server. Operation 200 involves knowledge graph 130, NLM trainer 220, training data 230 and natural language model 120.

Operation 200 begins with NLM trainer 220 accessing node 212 of knowledge graph 210. Knowledge graph 210 includes a plurality of nodes, but a single node is shown for simplicity. Node 212 includes text strings 214 relating to information stored at node 212, and node ID 2216 which can be used as an identifier for node 212 by entities external to knowledge graph 210.

Text strings 214 may be obtained by executing a knowledge engine associated with knowledge graph 210 using node ID 216 and, in some cases, dummy data needed for execution. Continuing the example from FIG. 1 above, if knowledge graph 210 is used with a tax preparation application, node 212 may correspond to information about computing a user's estimated tax. If so, to execute the knowledge engine the dummy data may correspond to generated tax or income information. In such a case, execution of the knowledge engine may result in JSON output including following text strings:
    "/EstimatedTax/Input/Total": {
        "id": "/EstimatedTax/Input/Total",
        "title": "Your estimated annual tax",
        "question": "How did you calculate my estimated annual tax as $21,015.01?",
        "explanationText": "Your estimated annual tax is $21,015.01, which we calculated by looking at your projected annual taxable business profit as well as the settings in your tax profile.", In this example, the text strings used by NLM trainer 220 are the words following "id" (a node identifier for this node), "title" (a brief summary of the node's data), "question" (an example question being responded to) and "explanationText" (a response generated by knowledge graph 130 in response to the example question).

NLM trainer 220 accesses each node of knowledge graph 210 in turn to obtain text strings and node IDs for each node, in order to generate training data 230. Training data 230 consists of a series of paired data, with individual text strings being paired with a node ID. For example, the portion of training data 230 corresponding to node 212 includes each text string of text string 214 paired with node ID 216. Following the example above, the portion of training data 230 corresponding to node 210 may appear in simplified form as follows:

| Your estimated annual tax | /EstimatedTax/Input/Total |
|---|---|
| Your estimated annual tax is $21,015.01, which we calculated by looking at your projected annual taxable business profit as well as the settings in your tax profile. | /EstimatedTax/Input/Total |
| How did you calculate my estimated annual tax as $21,015.01? | /EstimatedTax/Input/Total |
| /EstimatedTax/Input/Total | /EstimatedTax/Input/Total |

Training data 230 is then used by NLM trainer 220 to train natural language model 120. In general, training a machine learning model involves providing test input (such as a vector representing a word) to the machine learning model, with the machine learning model producing output as a result. This output is compared to a label for the test input, and the machine learning model is adjusted to produce output closer to the label. This process is repeated iteratively until the machine learning model produces sufficiently close output (according to a threshold or the opinion of an operator). In this example, each text string serves as test input, with the node IDs serving as labels for the text strings. When fully trained, natural language model 120 outputs a node ID of knowledge graph 130 for a particular string of text given as input.

In some cases, natural language model 120 is trained using only training data obtained from knowledge graph 130, with no external test data used. By so limiting the training data set, the domain of topics natural language model 120 can respond to is very closely tailored to the content of knowledge graph 210. In order to obtain additional training data for use in training natural language model 120, human support agents must review additional text strings and provide labeling (e.g., node IDs) for the additional text strings. Because training machine learning models often requires large sets of training data, this may be an impractical process to perform manually. By utilizing text strings of a previously-existing knowledge graph, training of natural language model 120 may be performed without requiring significant manual action.

NLM trainer 220 may perform various preprocessing operations on text strings while preparing training data 230. One preprocessing operation is stemming. Stemming is the process of reducing inflected (or sometimes derived) words to their word stem, base, or root form. Stemming algorithms such as Porter's Algorithm and others may be applied during stemming. Lemmatization is a more complex approach to determining a stem of a word that involves first determining the part of speech of a word, and applying different normalization rules for each part of speech. In lemmatization, the part of speech is first detected prior to attempting to find the root since for some languages, the stemming rules change depending on a word's part of speech.

In some cases, after performing preprocessing, word vectors may be generated from the preprocessed content and stored as training data 230. In other cases, natural language model 120 may be able to receive text strings as input rather than word vectors as input.

Figure 3:
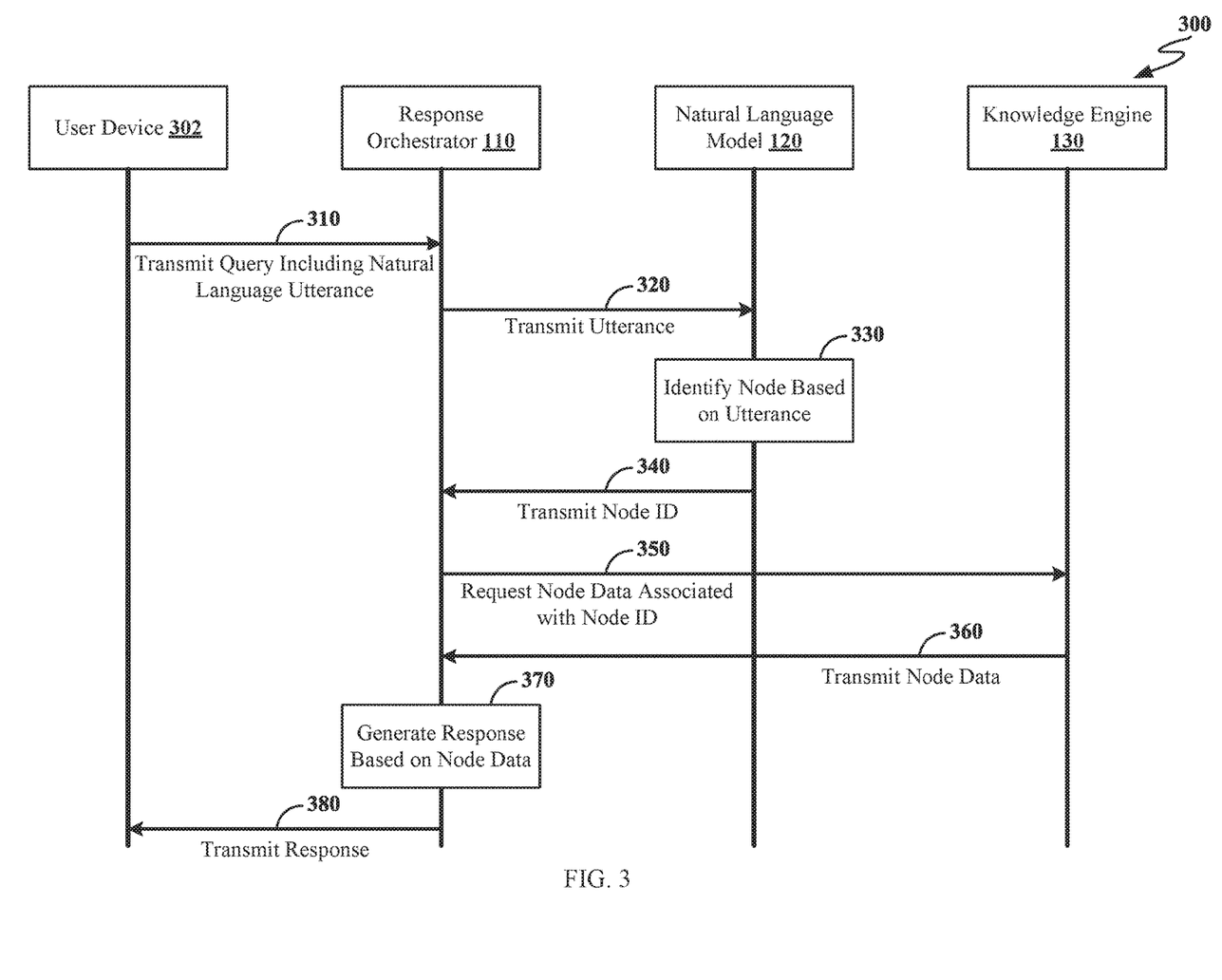
FIG. 3 is a call-flow diagram of a method for mapping natural language utterances to nodes of a knowledge graph.

FIG. 3 is a call-flow diagram of a method 300 for mapping natural language utterances to nodes of a knowledge graph. Method 300 begins at 310, where user device 302 transmits a query including a natural language utterance to response orchestrator 310. User device 302 may be one of various different types of computing devices, including desktop or laptop computers or mobile devices. In general user device 302 is used to execute a user application. In some cases, transmission 310 may be transmitted to response orchestrator 110 via a chatbot or other real-time assistance application. In such cases, the user query typically corresponds to a long-tail query which the chatbot is unable to respond to automatically.

At 320, response orchestrator 110 transmits the natural language utterance of transmission 310 to natural language model 120. Then, at 330, natural language model 330 identifies a node of a knowledge graph associated with knowledge engine 130 based on the natural language utterance. In this example, natural language model identifies a single node corresponding to the natural language utterance, however, in some cases, natural language model 120 may, instead of identifying a single node identifier, output a plurality of node identifiers paired with confidence values associated with the node identifiers. For example, confidence values may be scaled from 0 to 100, with higher values representing a higher confidence in the natural language utterance corresponding to the corresponding node identifier.

At 340, natural language model 120 transmits the identified node ID to response orchestrator 110. Thereafter, at 350, response orchestrator requests node data associated with the node ID received at 340, from knowledge engine 130. In some cases, this may involve an execution of knowledge engine 130 using the node ID as input to knowledge engine 130. After requesting the node data, at 360, knowledge engine 130 transmits the requested node data to response orchestrator 110.

At 370, response orchestrator 110 generates a response based on the node data received at 360. Depending on the node data received, generating the response may involve a number of actions. For example, if the node data received is explanation text as described above with respect to FIG. 2, generating the response may involve reformatting the explanation text to fit the format of the chatbot, or the format of the application execution on user device 302. In other cases, generating the response may involve constructing a response based on node data that is not a complete response along with user data and application progress data received from user device 302. Then, at 380, response orchestrator 110 transmits the response to user device 302.

Figure 4:
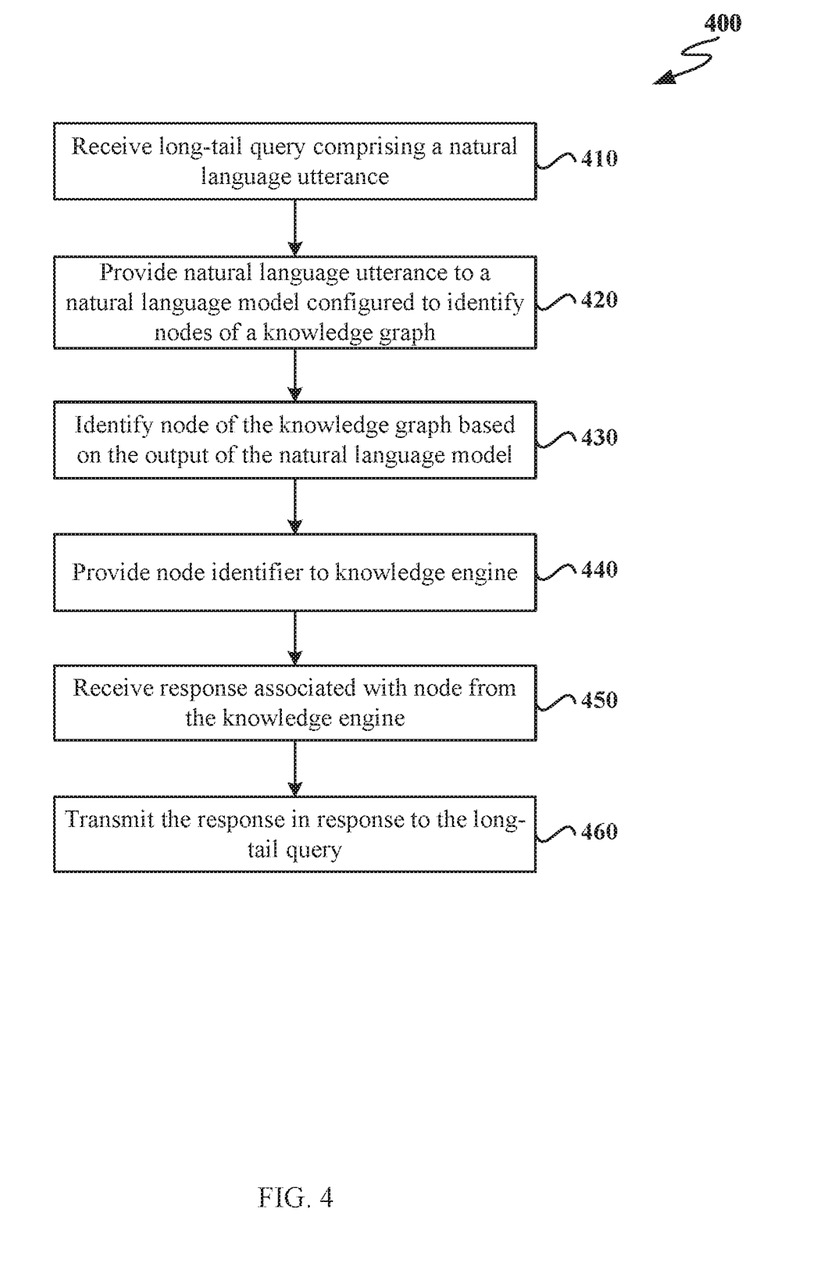
FIG. 4 is a flow chart of a method for mapping natural language to stored information.

FIG. 4 is a flow chart of a method 400 for mapping natural language to stored information. Method 400 may be performed by an application server executing a response orchestrator, such as response orchestrator 110 of FIG. 1. Method 400 begins at 410, where the application server receives a long-tail query from including at least one natural language utterance from a user of a web-accessible application associated with a set of topics. The set of topics may typically correspond to information related to the web-accessible application. For example, if the web-accessible application is a tax preparation application, the set of topics may include various tax-related topics. The chatbot may determine to transmit the long-tail query to the application server based on a determination that the long-tail query does not correspond to a response stored in a response database of the chatbot.

At 420, the application server provides the natural language utterance to a natural language model configured to identify nodes of a knowledge graph, wherein the knowledge graph is associated with a knowledge engine configured to respond to queries associated with the set of topics. As discussed above, the natural language model may be trained using training data obtained only from the knowledge graph, in order to closely fit the output of the natural language model to the knowledge graph itself. Generally, the knowledge graph includes information which can be used to respond to the long-tail query.

At 430, the application server identifies a node of the knowledge graph associated with the natural language utterance, based on output of the natural language model. As discussed, the natural language model may output a plurality of node identifiers along with confidence values, wherein a confidence value represents a confidence that the natural language utterance is associated with the node identifiers. In such a case, the application server may identify a node of knowledge graph. In such a case, the application server may apply a confidence threshold to identify all node identifiers which may be suitably related to the natural language utterance to include in a response. In other cases, the application server may select a highest confidence value of the plurality of confidence values.

At 440, the application server provides the node identifier to the knowledge engine. As discussed above, the knowledge engine may be configured to accept node identifiers as input, and output information of a node associated with the node identifier as output. In the case of a long-tail query, the information of the node associated with the node identifier typically can be used to respond to the long-tail query.

At 450, the application server receives a response associated with the node of the knowledge graph from the knowledge engine. As discussed, in other examples the application server may instead generate a response based on node data associated with the node identifier received from the knowledge graph.

At 460, the application server transmits the response to the user in response to the long-tail query. In some cases, the long-tail query is received by the application server via a chatbot application. In such cases, the response is transmitted to the user via the chatbot application. Further, in such cases, the application server may determine that the chatbot application does not store a response for the long-tail query. The application server may provide the natural language utterance to the natural language model based on the determination that the chatbot application does not store a response for the long-tail query.

In some examples of method 400, the output of the natural language model includes at least one node identifier and at least one confidence value, wherein the confidence value represents a confidence that the natural language utterance is associated with the at least one node identifier.

The output of the natural language model includes a plurality of node identifier and confidence value pairs, in some cases. In such cases, the application server may further identify one or more node identifiers associated with confidence values above a confidence threshold. Then, the application server may obtain one or more additional responses from the knowledge graph associated with the one or more node identifiers and transmit the one or more additional responses to the user.

In other cases, the application server may identify a node identifier associated with a highest confidence values of the plurality of node identifier and confidence value pairs, wherein the node identifier is associated with the node of the knowledge graph.

In some examples of method 400, the application server may further determine, based on the output of the natural language model, that the natural language utterance cannot identify the natural language utterance and generate a crowdsourcing job to obtain additional training data for the natural language model. The crowdsourcing job may be forwarded to a different component of the computing device executing the application server, or to a human operator of the computing device. In general, if the natural language model cannot identify the natural language utterance, it may mean that the natural language utterance relates to information not currently stored in the knowledge graph. By generating a crowdsourcing job, additional data may be added to the knowledge graph in order to improve both the knowledge graph itself and the functionality of the application server.

Figure 5:
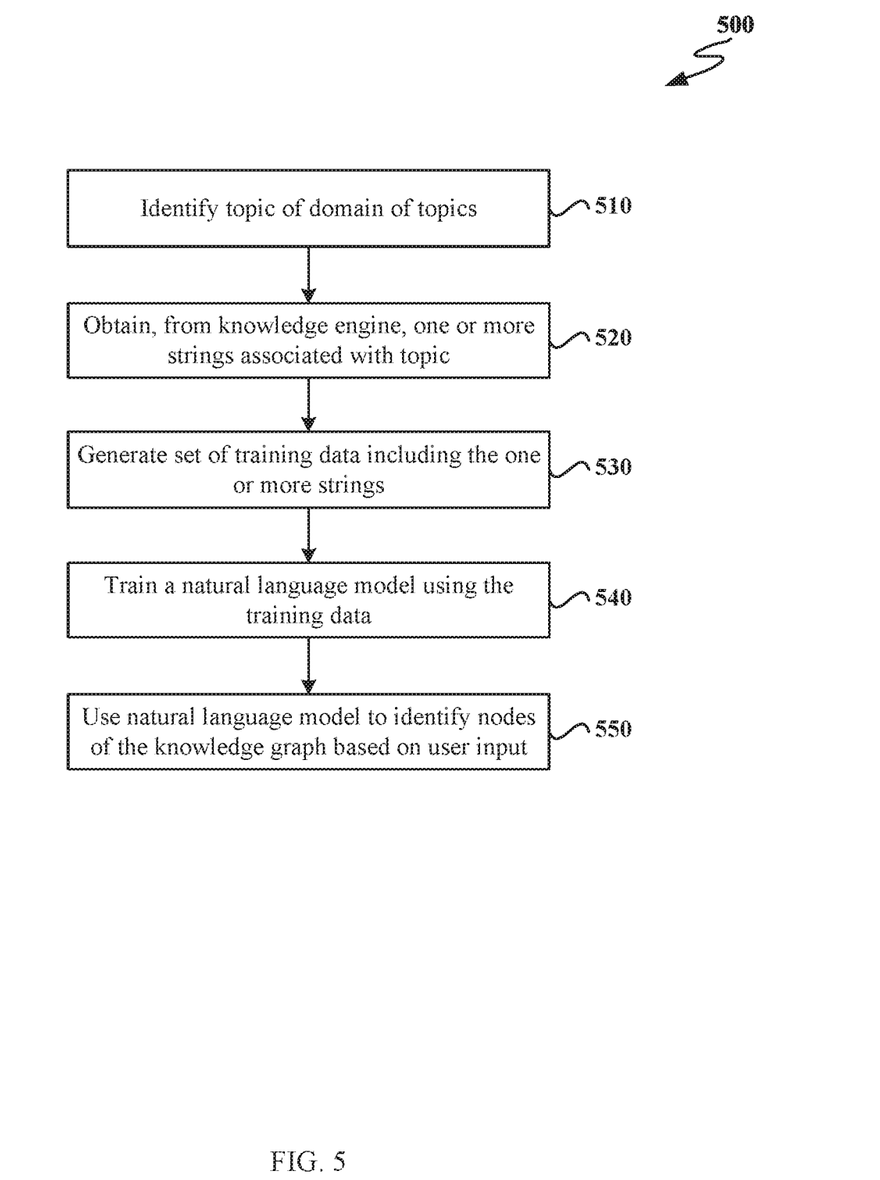
FIG. 5 is a flow chart of a method for training a natural language model.

FIG. 5 is a flow chart of a method 500 for training a natural language model. Method 500 may be performed by an application server executing a natural language model trainer, such as NLM trainer 220 of FIG. 2. Method 500 begins at 510, where the NLM trainer identifies a topic of a domain of topics associated with an application. In general, the application server may serve as a host for the web-accessible application.

At 520, the application server obtains, from a knowledge engine configured to respond to queries associated with the domain of topics, one or more strings associated with the topic, wherein the knowledge engine is configured to output information from a node of a knowledge graph based on a node identifier associated with the node of the knowledge graph. As discussed above, obtaining data from the knowledge graph may involve an execution of the knowledge engine using a node identifier as input, in addition to dummy data simulating a typical in-application execution of the knowledge graph. The knowledge engine then outputs the one or more strings in response to the input.

At 530, the application server generates a set of training data including the one or more strings associated with the topic, wherein the one or more strings are associated with a node identifier. As discussed above, the training data may include all strings obtained from all nodes of the knowledge graph, such that the training data represents a more or less complete copy of the information stored in the knowledge graph.

At 540, the application server trains a natural language model using the training data, wherein the natural language model is configured to identify nodes of the knowledge graph based on natural language utterances. In general, by providing training data of the one or more text strings labeled using node identifiers, the natural language model may be trained to output node identifiers of the knowledge graph based on any text input, such as natural language utterances. In some examples of method 500, the training data does not include data from sources other than the knowledge graph.

At 550, the application server uses the natural language model to identify a first node of the knowledge graph based on input received from a user. In some cases, the input may be received from the user via a chatbot application associated with the application. If so, as discussed above with respect to FIG. 4, a response may be sent to the user via the chatbot application. In some cases the input received from the user may include a long-tail query.

Figure 6:
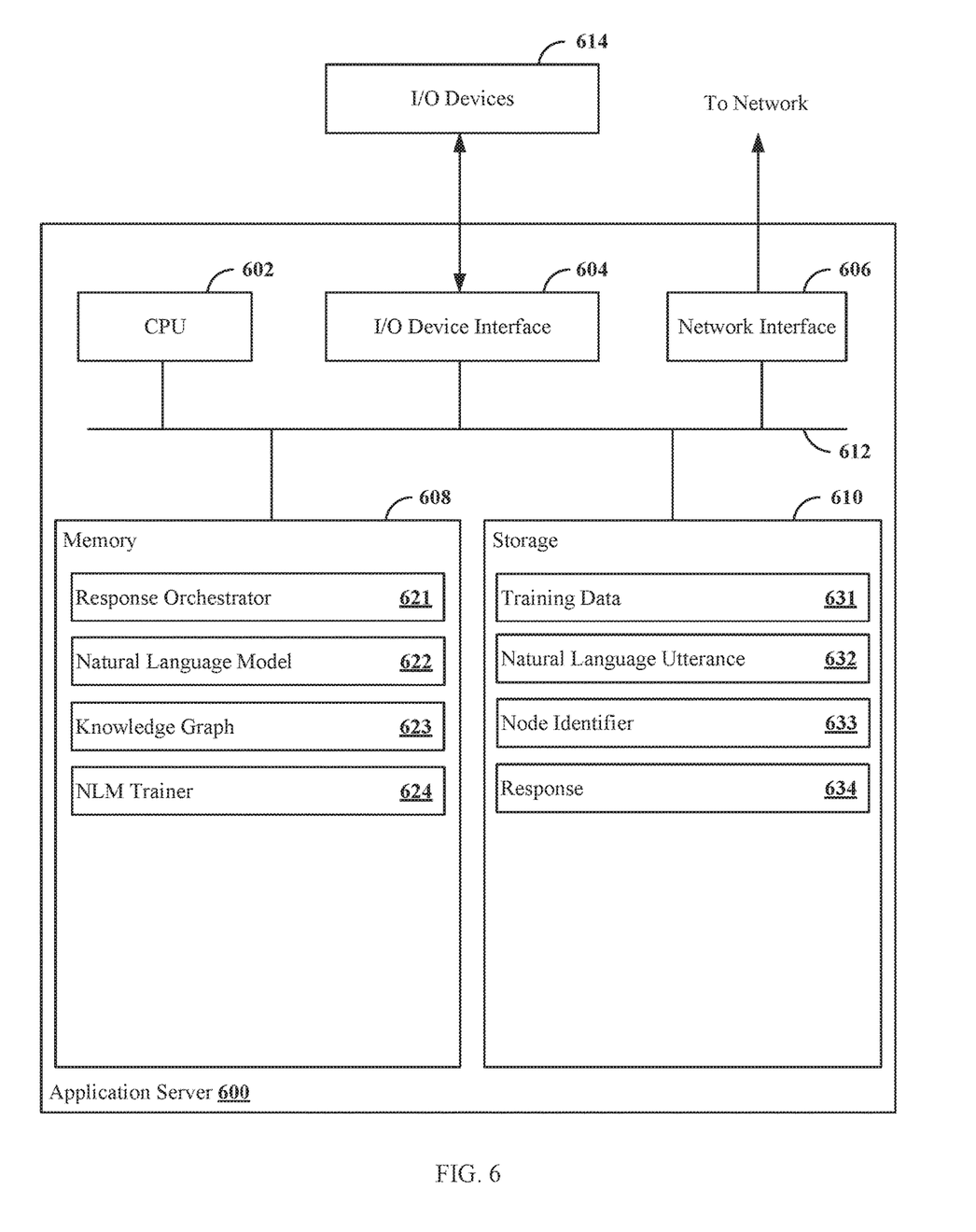
FIG. 6 is a block diagram of example application server, according to one embodiment.

FIG. 6 is a block diagram of example application server 600, according to one embodiment. As shown, the application server 600 includes, without limitation, a central processing unit (CPU) 602, one or more input/output (I/O) device interfaces 604, which may allow for the connection of various I/O devices 614 (e.g., keyboards, displays, mouse devices, pen input, etc.) to application server 600, network interface 606, memory 608, storage 610, and an interconnect 612.

The CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. The CPU 602 is included to be representative of a single CPU, multiple CPUs, a single CPU having multiple processing cores, and the like. The I/O device interface 604 may provide an interface for capturing data from one or more input devices integrated into or connected to the application server 600, such as keyboards, mice, touchscreens, and so on. The memory 608 may represent a random access memory (RAM), while the storage 610 may be a solid state drive, for example. Although shown as a single unit, the storage 610 may be a combination of fixed and/or removable storage devices, such as fixed drives, removable memory cards, network attached storage (NAS), or cloud-based storage.

As shown, the memory 608 includes response orchestrator 621, natural language model 622, knowledge graph 623 and NLM trainer 624, which are software routines executed based on instructions stored in the storage 610. Such instructions may be executed by the CPU 602.

As shown, the storage 610 includes training data 631, natural language utterance 632, node identifier 633 and response 634. Training data 631 is generated by NLM trainer 624 based on data obtained from knowledge graph 623. NLM trainer uses training data 631 to train natural language model 622. Thereafter, response orchestrator 621 receives a query from a user including natural language utterance 632. Natural language utterance 632 may be obtained, for example, via network interface 606. After natural language utterance 632 is obtained, response orchestrator provides natural language utterance 632 to natural language model 622, which outputs node identifier 633 as a result. Response orchestrator 633 then uses node identifier 633 to obtain response 634 from knowledge graph 623, and thereafter transmits response 634 in response to the initial query from the user.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for mapping natural language to stored information, comprising:
    receiving a query comprising a natural language utterance from a user of an application associated with a set of topics;
    providing the natural language utterance to a natural language model trained to identify nodes of a knowledge graph associated with the set of topics when receiving a given natural language utterance as input;
    receiving, from the natural language model, based on the natural language utterance, a first identifier corresponding to a first node of the knowledge graph for a knowledge engine to access;
    receiving, from the natural language model, a plurality of pairs, wherein each given pair in the plurality of pairs comprises a respective node identifier paired with a confidence value representing a confidence that the natural language utterance is associated with the respective node identifier of the given pair;
    identifying a first pair of the plurality of pairs, wherein the first pair comprises the first node identifier and a highest confidence value;
    providing the first node identifier to the knowledge engine based on the first pair, wherein the knowledge engine is configured to retrieve corresponding node data from a given node of the knowledge graph when receiving a given node identifier as input;
    receiving, from the knowledge engine, node data from the first node based on the first node identifier;
    determining a response based on the node data; and
    transmitting the response to the user in response to the query.

2. The method of claim 1, wherein the natural language model is trained using only training data obtained from the knowledge graph.

3. The method of claim 1, further comprising:
    identifying one or more node identifiers paired with confidence values above a confidence threshold;
    obtaining one or more additional responses from the knowledge graph associated with the one or more node identifiers associated with the confidence values above the confidence threshold; and
    transmitting the one or more additional responses to the user.

4. The method of claim 1, wherein the query is received via a chatbot application, wherein the response is transmitted to the user via the chatbot application.

5. The method of claim 4, further comprising determining that a response database associated with the chatbot application does not store the response for the query.

6. The method of claim 1, further comprising:
    determining that the natural language model can not identify the natural language utterance; and
    generating a crowdsourcing job to obtain additional training data for the natural language model.

7. A computing device for mapping natural language to stored information, including:
    a processor, and
    a memory including computer-readable instructions that, when executed by the processor, cause the computing device to:
        receive a query comprising a natural language utterance from a user of an application associated with a set of topics;
        determine that a response database associated with the application does not comprise a response to the query;
        provide, based on the response database not comprising a response to the query, the natural language utterance to a natural language model trained to identify nodes of a knowledge graph, wherein each node of the knowledge graph is associated with at least one topic of the set of topics;
        receive, from the natural language model, based on the natural language utterance, a node identifier corresponding to a node of the knowledge graph;
        provide the node identifier to a knowledge engine configured to retrieve corresponding node data from the knowledge graph based on receiving a given node identifier;
        receive, from the knowledge engine, node data from the node based on the node identifier;
        receive a confidence value corresponding to the node identifier;
        determine whether the natural language utterance is related to the node identifier based on the confidence value and a confidence threshold;
        generate a response to the query based on whether the natural language utterance is related to the node identifier; and
        transmit the response to the user.

8. The computing device of claim 7, wherein the natural language model is trained using only training data obtained from the knowledge graph.

9. The computing device of claim 7, wherein, when the computer-readable instructions are executed, the processor further causes the computing device to receive, from the natural language model, a plurality of node identifier and confidence value pairs.

10. The computing device of claim 9, wherein, when the computer-readable instructions are executed, the processor further causes the computing device to identify a node identifier and confidence value pair of the plurality of node identifier and confidence value pairs, wherein the node identifier and confidence value pair comprises a highest confidence value and a node identifier of the node identifier and confidence value pair is associated with the node of the knowledge graph.

11. The computing device of claim 7, wherein, when the computer-readable instructions are executed, the processor further causes the computing device to:
  identify one or more node identifiers associated with confidence values above the confidence threshold;
  obtain one or more additional responses from the knowledge graph associated with the one or more node identifiers associated with the confidence values above the confidence threshold; and
  transmit the one or more additional responses to the user.

12. The computing device of claim 7, wherein the query is received via a chatbot application, wherein the response is transmitted to the user via the chatbot application.

13. The computing device of claim 7, wherein, when the computer-readable instructions are executed, the processor further causes the computing device to:
  determine the natural language model can not identify the natural language utterance; and
  generate a crowdsourcing job to obtain additional training data for the natural language model.

14. A method for generating a query response, comprising:
  receiving a query comprising a natural language utterance from a user of an application;
  determining that a response database associated with the application does not comprise a response to the query;
  providing, based on the determining, the natural language utterance to a natural language model trained to identify nodes of a knowledge graph, wherein each node of the knowledge graph is associated with at least one topic of a set of topics;
  receiving, from the natural language model, based on the natural language utterance, a node identifier corresponding to a node of the knowledge graph;
  providing the node identifier to a knowledge engine configured to retrieve corresponding node data from the knowledge graph based on receiving a given node identifier;
  receiving, from the knowledge engine, node data from the node based on the node identifier;
  receiving a confidence value corresponding to the node identifier;
  determining whether the natural language utterance is related to the node identifier based on the confidence value and a confidence threshold;
  generating a response to the query based on the determining whether the natural language utterance is related to the node identifier; and
  transmitting the response to the user.

15. The method of claim 14, wherein:
  determining whether the natural language utterance is related to the node identifier comprises determining that the natural language utterance is not related to the node identifier; and
  generating the response to the query comprises generating a crowdsourcing job in order to add nodes to the knowledge graph.

16. The method claim 14, further comprising:
  identifying one or more node identifiers paired with confidence values above the confidence threshold;
  obtaining one or more additional responses from the knowledge graph associated with the one or more node identifiers associated with the confidence values above the confidence threshold; and
  transmitting the one or more additional responses to the user.

17. The method of claim 14, further comprising receiving, from the natural language model, a plurality of pairs, wherein each pair comprises a node identifier and associated confidence value.

18. The method of claim 17, further comprising identifying a pair of the plurality of pairs, wherein the pair comprises a highest confidence value.

19. The method of claim 14, wherein the query is received via a chatbot application, wherein the response is transmitted to the user via the chatbot application.

* * * * *